(12) United States Patent
Nemoto

(10) Patent No.: US 7,717,408 B2
(45) Date of Patent: May 18, 2010

(54) CONTROL SYSTEM FOR ACTIVE VIBRATION ISOLATION SUPPORT SYSTEM AND METHOD OF USE

(75) Inventor: Hirotomi Nemoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 862 days.

(21) Appl. No.: 11/496,020

(22) Filed: Jul. 28, 2006

(65) Prior Publication Data

US 2007/0029712 A1  Feb. 8, 2007

(30) Foreign Application Priority Data

Aug. 5, 2005  (JP)  ............................. 2005-227763

(51) Int. Cl.
*F16F 5/00* (2006.01)
*F16M 1/00* (2006.01)
(52) U.S. Cl. .................. 267/140.14; 123/192.1; 701/111
(58) Field of Classification Search ............ 267/140.14, 267/140.15; 123/192.1, 198 F, 481; 701/111
See application file for complete search history.

(56) References Cited

U.S. PATENT DOCUMENTS

| | | | |
|---|---|---|---|
| 4,977,508 A * | 12/1990 | Tanaka et al. ............... | 701/111 |
| 5,033,425 A * | 7/1991 | Kadomukai et al. ...... | 123/192.1 |
| 5,176,118 A * | 1/1993 | Norota ........................ | 123/435 |
| 7,017,889 B2 * | 3/2006 | Abe ....................... | 267/140.15 |
| 2007/0013116 A1 * | 1/2007 | Nemoto et al. ......... | 267/140.14 |

FOREIGN PATENT DOCUMENTS

JP  2003-113892  4/2003

* cited by examiner

*Primary Examiner*—Melody M Burch
(74) *Attorney, Agent, or Firm*—Carrier, Blackman & Associates P.C.; Joseph P. Carrier; William D. Blackman

(57) ABSTRACT

In a V6 engine that can switch between a first running state and a second running state which differ in the number of cylinders that are permitted to operate, when switching from L3 selective cylinder operation to V4 selective cylinder operation is determined to be required, control of an active vibration isolation support system corresponding to L3 selective cylinder operation is normally continued for one cycle. However, in this case of switching from L3 selective cylinder operation to V4 selective cylinder operation, a vibration pattern of L3 selective cylinder operation continues for longer than usual, that is, for a period greater than one cycle. Therefore, control of the active vibration isolation support system corresponding to the vibration pattern of L3 selective cylinder operation is continued for two cycles of the vibration pattern, thereby further effectively improve a vibrational state when switching between running states from L3 selective cylinder operation to V4 selective cylinder operation.

16 Claims, 9 Drawing Sheets

FIG.1
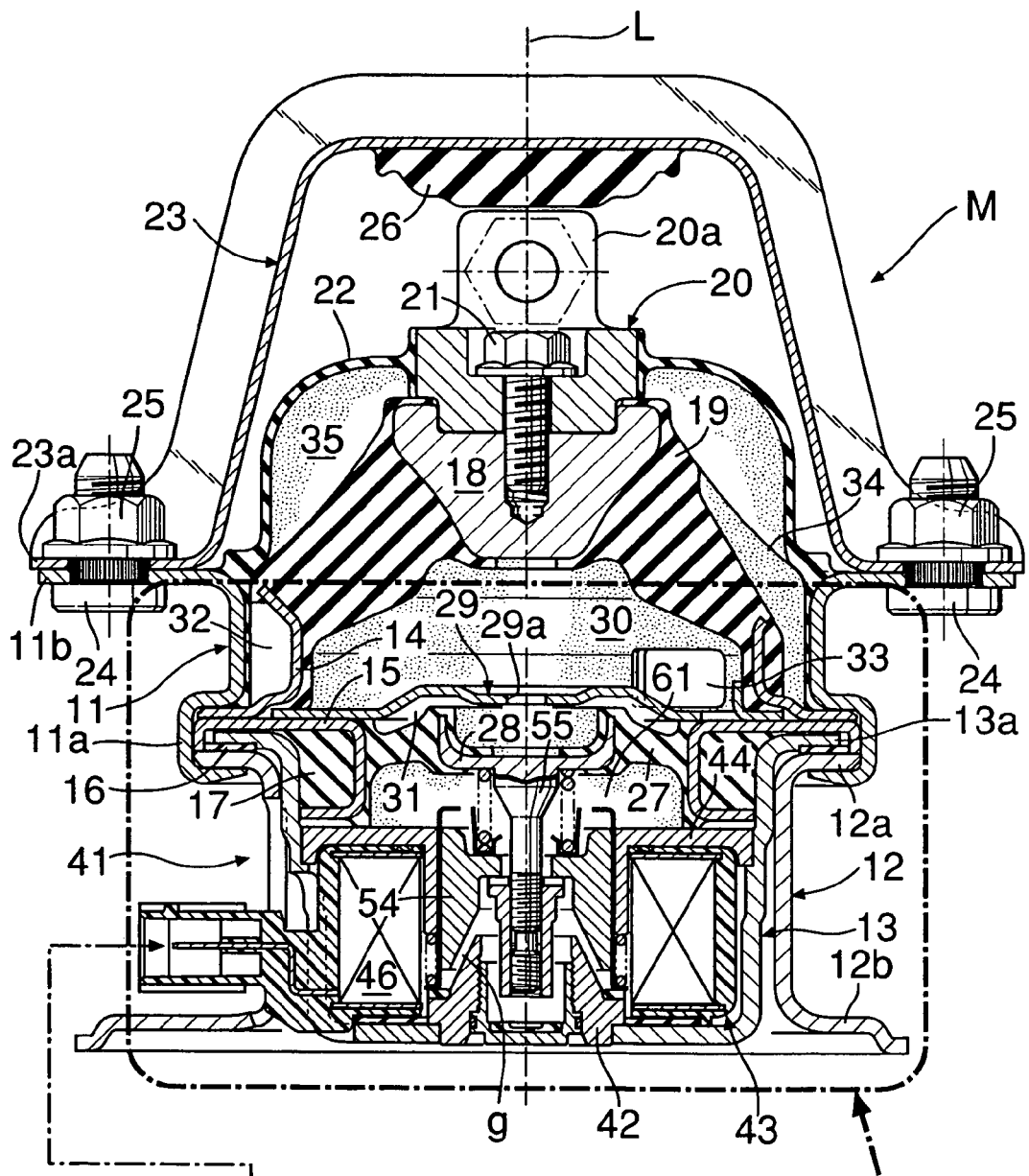
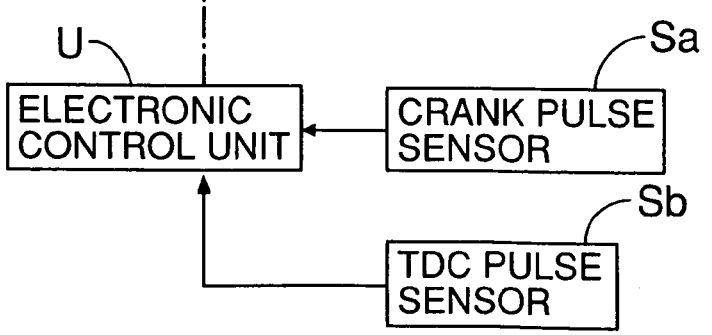

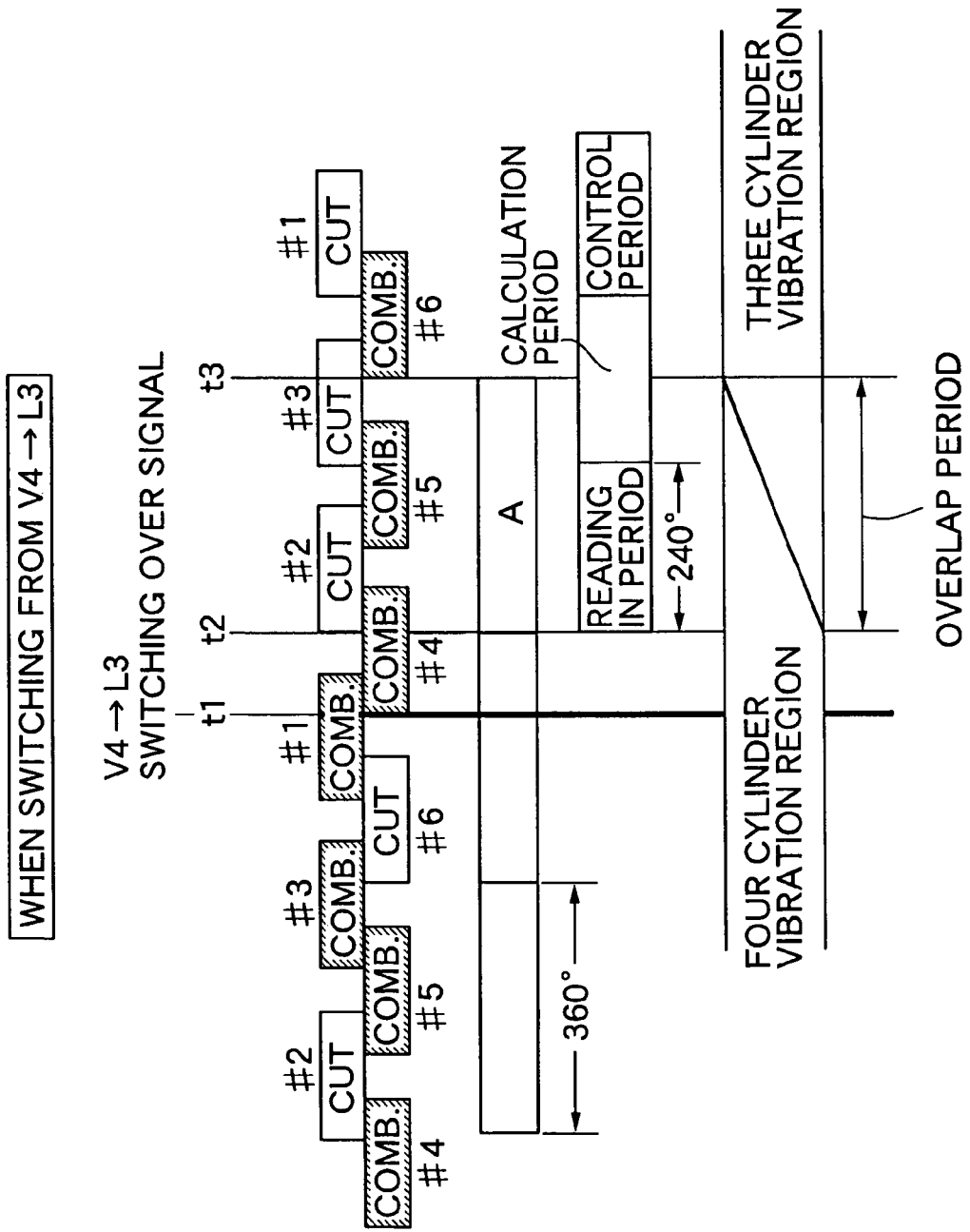

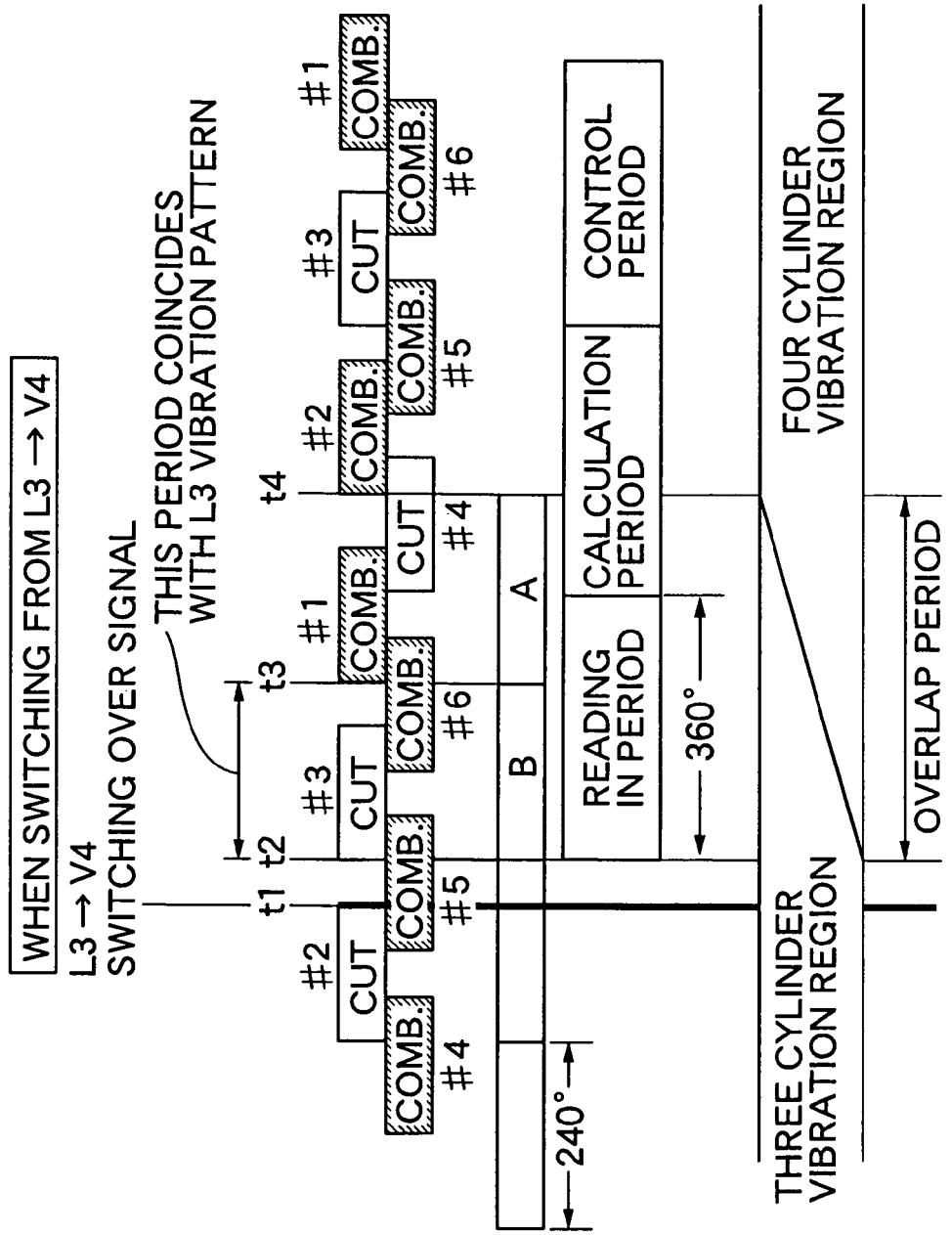

CONTROL SYSTEM FOR ACTIVE VIBRATION ISOLATION SUPPORT SYSTEM AND METHOD OF USE

RELATED APPLICATION DATA

The present invention claims priority under 35 USC 119 based on Japanese patent application No. 2005-227763, filed on Aug. 5, 2005. The subject matter of this priority document is incorporated in its entirety by reference herein.

BACKGROUND OF INVENTION

1. Field of Invention

The present invention relates to a control system for an active vibration isolation support system which supports, on a vehicle body, an engine that can selectively switch between a first running state and a second running state which differ in the number of cylinders that are permitted to operate. The control system includes a control device for controlling an actuator of the active vibration isolation support system according to a vibrational state of the engine so as to suppress transmission of vibration from the engine to the vehicle body.

2. Description of Related Art

Japanese Patent Application Laid-open No. 2003-113892 discloses a device in which a vibrational state of an engine is estimated from an angular acceleration of a crankshaft of an engine, and operation of an actuator of an active vibration isolation support system is controlled based on the vibrational state. In this device, if the engine vibration is large and it is easy to estimate the phase (for example, during selective cylinder operation in which only a subset of all cylinders is permitted to operate), the operation of the actuator is controlled based on the estimated phase for the engine vibration, whereas if the engine vibration is small and it is difficult to estimate the phase (for example, during all-cylinder operation), the operation of the actuator is controlled based on a preset phase for the engine vibration.

In some V6 engines, the operation can be switched between a selective cylinder operation state in which the engine runs as an in-line three cylinder engine with a bank on one side made non-operational, and a selective cylinder operation state in which the engine runs as a V4 engine with one cylinder in each of the two banks made non-operational. In this case, there are three running states, that is, V6 all-cylinder operation, L3 selective cylinder operation, and V4 selective cylinder operation. When switching among these three running states, the vibrational state prior to the switch continues due to the inertia of the engine for approximately one cycle of vibration after the switch. If the control of the active vibration isolation support system for the vibrational state prior to switching between running states is continued, after the switch, for a period corresponding to only one vibration cycle, the vibrational state during the switch can be improved.

However, depending on the combination of a running state prior to switching between running states of the engine and a running state subsequent to the switch, there is a case where the vibrational state prior to the switch may continue for a longer period of time after the switch. In this case, it is desirable that control of the active vibration isolation support system corresponding to the vibrational state prior to the switching between running states is continued after the switch for a longer period than the period corresponding to one vibration cycle.

SUMMARY

The present invention has been accomplished under the above circumstances, and it is an object thereof to improve a vibrational state at the time of switching between running states in an engine that can switch between a plurality of running states that differ in the number of cylinders that are permitted to operate.

In order to achieve the above object, according to the present invention, there is provided a control system for an active vibration isolation support system which supports, on a vehicle body, an engine that can switch between a first running state and a second running state which differ in the number of cylinders that are permitted to operate. The control system includes a control device for controlling an actuator of the active vibration isolation support system according to a vibrational state of the engine so as to suppress transmission of vibration from the engine to the vehicle body. The control device continues control of the actuator corresponding to a vibration pattern of a running state prior to switching between running states for at least a period corresponding to one cycle of the vibration pattern, after determining that a switch between the first and second running states is required. In addition, if the vibration pattern of the running state prior to switching between running states continues after the control device determines that a switch between the first and second running states is required, the control device continues control of the actuator corresponding to the vibration pattern of the running state prior to switching between running states for a period corresponding to one cycle of the vibration pattern after extinction of the vibration pattern of the running state prior to the switching between running states.

An electronic control unit U of an embodiment corresponds to the control device of the present invention.

With this arrangement, when the control device determines that switching between running states between the first and second running states is required, control of the actuator corresponding to a vibration pattern of the running state prior to the switch is normally continued for a period corresponding to one cycle of the vibration pattern, but in a case where the vibration pattern of the running state prior to switching between running states continues after determining that a switch is required, control of the actuator corresponding to the vibration pattern of the running state prior to switching between running states is continued for a period corresponding to one cycle of the vibration pattern after the extinction of the vibration pattern of the running state prior to the switch. Therefore, it is possible to more effectively improve the vibrational state when switching between the first and second running states by the active vibration isolation support system.

The above-mentioned objects, other objects, characteristics, and advantages of the present invention will become apparent from a preferred embodiment that will be described in detail below by reference to the attached drawings.

BRIEF DESCRIPTION OF DRAWINGS

FIG. 1 to FIG. 9 show one embodiment of the present invention;

FIG. 1 is a vertical sectional view of an active vibration isolation support system, FIG. 2 is an enlarged view of the area indicated by reference number 2 in FIG. 1 showing the details of the actuator portion of the active vibration isolation support system, FIG. 3 is a diagram showing cylinder numbers and the combustion order of a V6 engine, FIG. 4 is a diagram showing a read-in period, a calculation period and a control period during V6 all-cylinder operation, FIG. 5 is a flowchart for explaining a technique of controlling the active vibration isolation support system, FIG. 6 is a time chart for explaining the operation of the active vibration isolation support system during a transition from V6 all-cylinder operation to L3 selective cylinder operation, FIG. 7 is a time chart for explaining the operation of the active vibration isolation support system during a transition from L3 selective cylinder operation to V6 all-cylinder operation, FIG. 8 is a time chart for explaining the operation of the active vibration isolation support system during a transition from V4 selective cylinder operation to L3 selective cylinder operation, and FIG. 9 is a time chart for explaining the operation of the active vibration isolation support system during a transition from L3 selective cylinder operation to V4 selective cylinder operation.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 2:
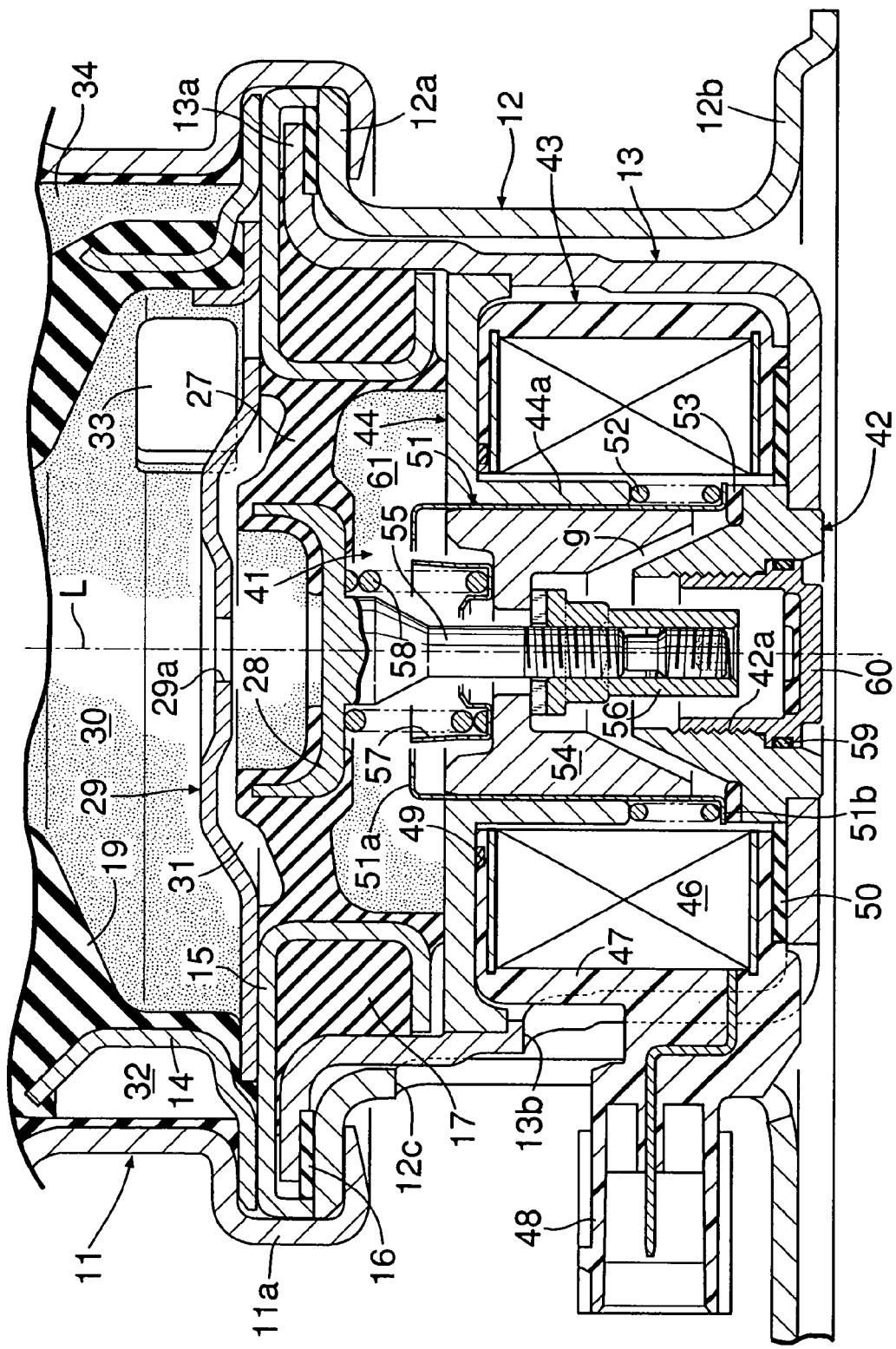

Referring to FIG. 1 and FIG. 2, an active vibration isolation support system M (active control mount) for elastically supporting an automobile engine in a vehicle body frame has a structure that is substantially symmetrical with respect to an axis L, in which, between a flange portion 11a at the lower end of a substantially cylindrical upper housing 11 and a flange portion 12a at the upper end of a substantially cylindrical lower housing 12, a flange portion 13a on the outer periphery of an upwardly opening substantially cup-shaped actuator case 13, an outer peripheral portion of an annular first elastic body support ring 14, and an outer peripheral portion of an annular second elastic body support ring 15 are superimposed and joined by crimping. In this process, an annular first floating rubber member 16 is disposed between the flange portion 12a of the lower housing 12 and the flange portion 13a of the actuator case 13, and an annular second floating rubber member 17 is disposed between an upper part of the actuator case 13 and an inner face of the second elastic body support ring 15, so that the actuator case 13 is floatingly supported such that it can move relative to the upper housing 11 and the lower housing 12.

Joined by vulcanization bonding to the first elastic body support ring 14 and a first elastic body support boss 18 disposed on the axis L, are the lower end and the upper end of a first elastic body 19 made of a thick rubber. A diaphragm support boss 20 is fixed to an upper face of the first elastic body support boss 18 by a bolt 21. An outer peripheral portion of a diaphragm 22, whose inner peripheral portion is joined by vulcanization bonding to the diaphragm support boss 20, is joined by vulcanization bonding to the upper housing 11. An engine mounting portion 20a integrally formed on an upper face of the diaphragm support boss 20 is fixed to the engine.

A vehicle body mounting portion 12b at the lower end of the lower housing 12 is fixed to the vehicle body frame.

A flange portion 23a at the lower end of a stopper member 23 is joined by bolts 24 and nuts 25 to a flange portion 11b at the upper end of the upper housing 11. The engine mounting portion 20a projectingly provided on the upper face of the diaphragm support boss 20 faces a stopper rubber member 26 attached to an upper inner face of the stopper member 23 so that the engine mounting portion 20a can abut against the stopper rubber member 26. When a large load is input to the active vibration isolation support system M, the engine mounting portion 20a abuts against the stopper rubber member 26, thereby suppressing excessive displacement of the engine.

An outer peripheral portion of a second elastic body 27, made of a membranous rubber, is joined by vulcanization bonding to the second elastic body support ring 15. A movable member 28 is embedded in and joined by vulcanization bonding to a central portion of the second elastic body 27. A disc-shaped partition member 29 is fixed between an upper face of the second elastic body support ring 15 and the outer peripheral portion of the first elastic body 19. A first liquid chamber 30 defined by the partition member 29 and the first elastic body 19, and a second liquid chamber 31 defined by the partition member 29 and the second elastic body 27, communicate with each other via a through hole 29a formed in the middle of the partition member 29.

An annular through passage 32 is formed between the first elastic body support ring 14 and the upper housing 11. One end of the through passage 32 communicates with the first liquid chamber 30 via a through hole 33, and the other end of the through passage 32 communicates via a through hole 34 with a third liquid chamber 35 defined by the first elastic body 19 and the diaphragm 22.

The structure of an actuator 41 for driving the movable member 28 is now described.

Mounted within the actuator case 13 in sequence from the bottom to the top are a stationary core 42, a coil assembly 43, and a yoke 44. The coil assembly 43 is formed from a cylindrical coil 46 and a coil cover 47 covering the outer periphery of the coil 46. The coil cover 47 is formed integrally with a connector 48 running through openings 13b and 12c formed in the actuator case 13 and the lower housing 12 and extending outward.

A seal 49 is disposed between an upper face of the coil cover 47 and a lower face of the yoke 44. A seal 50 is disposed between a lower face of the coil cover 47 and an upper face of the actuator case 13. These seals 49 and 50 can prevent water or dust from entering an internal space 61 of the actuator 41 via the openings 13b and 12c formed in the actuator case 13 and the lower housing 12.

A thin cylindrical bearing member 51 is fitted, in a vertically slidable manner, into an inner peripheral face of a cylindrical portion 44a of the yoke 44. An upper flange 51a and a lower flange 51b are formed at the upper end and the lower end respectively of the bearing member 51, the upper flange 51a being bent radially inward, the lower flange 51b being bent radially outward. A set spring 52 is disposed in a compressed state between the lower flange 51b and the lower end of the cylindrical portion 44a of the yoke 44. The bearing member 51 is supported by the yoke 44 by the lower flange 51b being pressed against the upper face of the stationary core 42 via an elastic body 53 by means of the elastic force of the set spring 52.

A substantially cylindrical movable core 54 is fitted, in a vertically slidable manner, into an inner peripheral face of the bearing member 51. A rod 55 extending downward from the center of the movable member 28 runs loosely through the center of the movable core 54, and a nut 56 is tightened around the lower end of the rod 55. A set spring 58 is disposed in a compressed state between a spring seat 57 provided on an upper face of the movable core 54 and a lower face of the movable member 28. The movable core 54 is fixed by being pressed against the nut 56 by means of the elastic force of the set spring 58. In this state, the lower face of the movable core 54 and the upper face of the stationary core 42 face each other across a conical air gap g. The rod 55 and the nut 56 are loosely fitted into an opening 42a formed in the center of the stationary core 42, and the lower end of this opening 42a is blocked by a plug 60 via a seal 59.

A crank pulse sensor Sa for detecting a crank pulse output accompanying rotation of a crankshaft of the engine and a TDC pulse sensor Sb for detecting a TDC pulse of each cylinder are connected to an electronic control unit U, which controls the supply of current to the actuator 41 of the active vibration isolation support system M. The crank pulse of the engine is output 24 times per revolution of the crankshaft, that is, once every 15° of crank angle.

Figure 3:
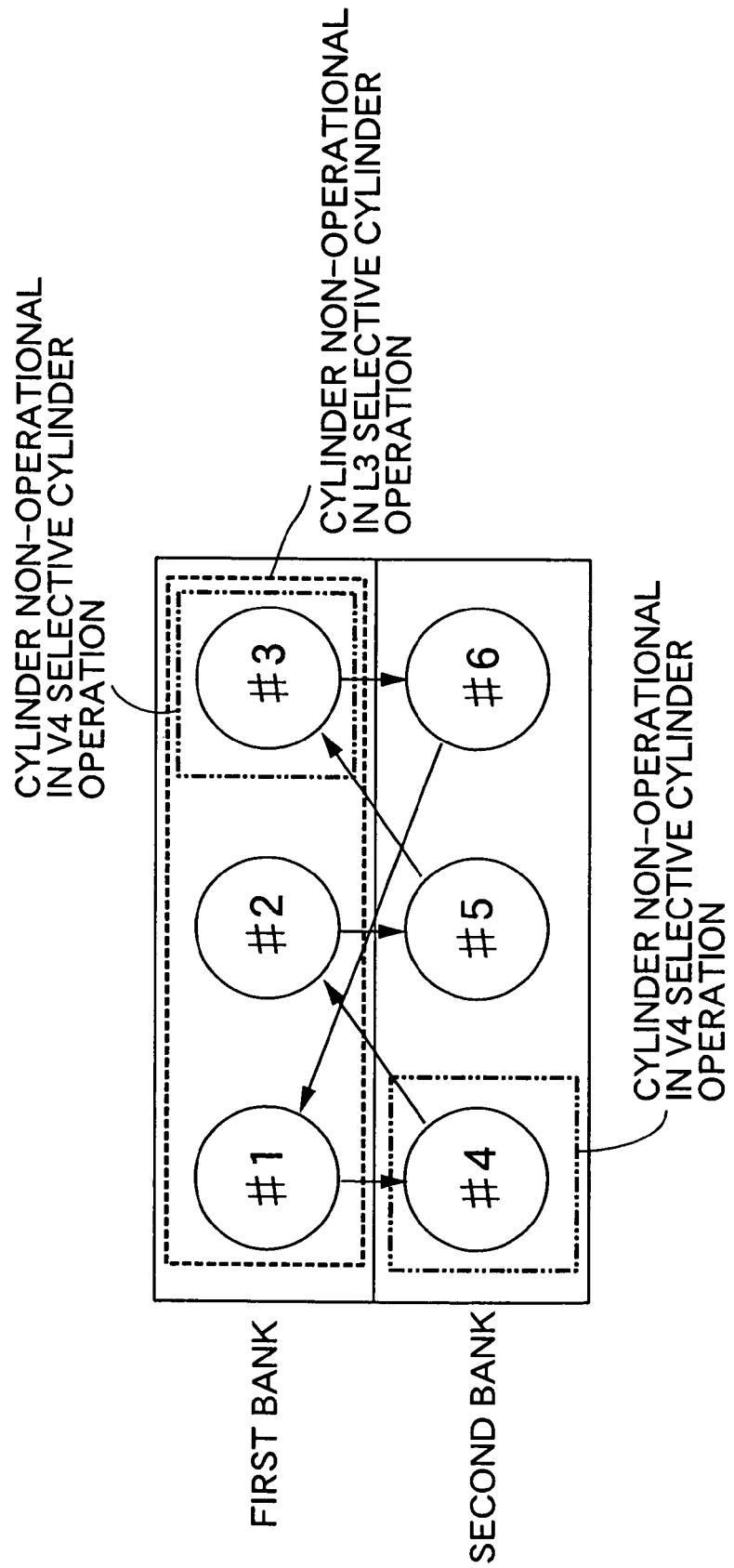

As shown in FIG. 3, the engine is a V6 engine; a #1 cylinder, a #2 cylinder and a #3 cylinder are disposed in a first bank, and a #4 cylinder, a #5 cylinder and a #6 cylinder are disposed in a second bank. The engine can switch, according to the load state of the engine, between all-cylinder operation in which the #1 cylinder to #6 cylinder are combusted in the order of #1→#4→#2→#5→#3→#6 (hereinafter, called V6 all-cylinder operation), selective cylinder operation in which #1 cylinder, #2 cylinder and #3 cylinder of the first bank are made non-operational (hereinafter, called L3 selective cylinder operation), and selective cylinder operation in which #3 cylinder of the first bank and #4 cylinder of the second bank are made non-operational (hereinafter, called V4 selective cylinder operation). The combustion order of L3 selective cylinder operation is #1→#2→#3, and the combustion order of V4 selective cylinder operation is #1→#4 (non-operational)→#2→#5→#3 (non-operational)→#6.

In V6 all-cylinder operation, since the #1 cylinder to #6 cylinder are respectively combusted once at equal intervals while the crankshaft rotates twice, the engine vibrational state is $3^{rd}$ order vibration (three cycles of vibration in one revolution of the crankshaft), and thus one cycle of the vibration is 120°.

In L3 selective cylinder operation, since #4 cylinder, #5 cylinder, and #6 cylinder of the second bank are respectively combusted once at equal intervals while the crankshaft rotates twice, the engine vibrational state is $1.5^{th}$ order vibration (1.5 cycles of vibration in one revolution of the crankshaft), and thus one cycle of the vibration is 240°.

In V4 selective cylinder operation, since one cycle of vibration is formed by the combination of one non-operational cylinder period having a crank angle of 120° and two combustion periods having a crank angle of 120°, the engine vibrational state is $1^{st}$ order vibration (one cycle of vibration in one revolution of the crankshaft), and thus one cycle of the vibration is 360°. Therefore, in V4 selective cylinder operation, for setting one cycle, there are first to third patterns shown below. Here, 'comb.' means combustion, and 'cut' means cut-off First pattern: 'comb.'→'cut'→'comb.'
Second pattern: 'cut'→'comb.'→'comb.'
Third pattern: 'comb.'→'comb.'→'cut'

Figure 4:
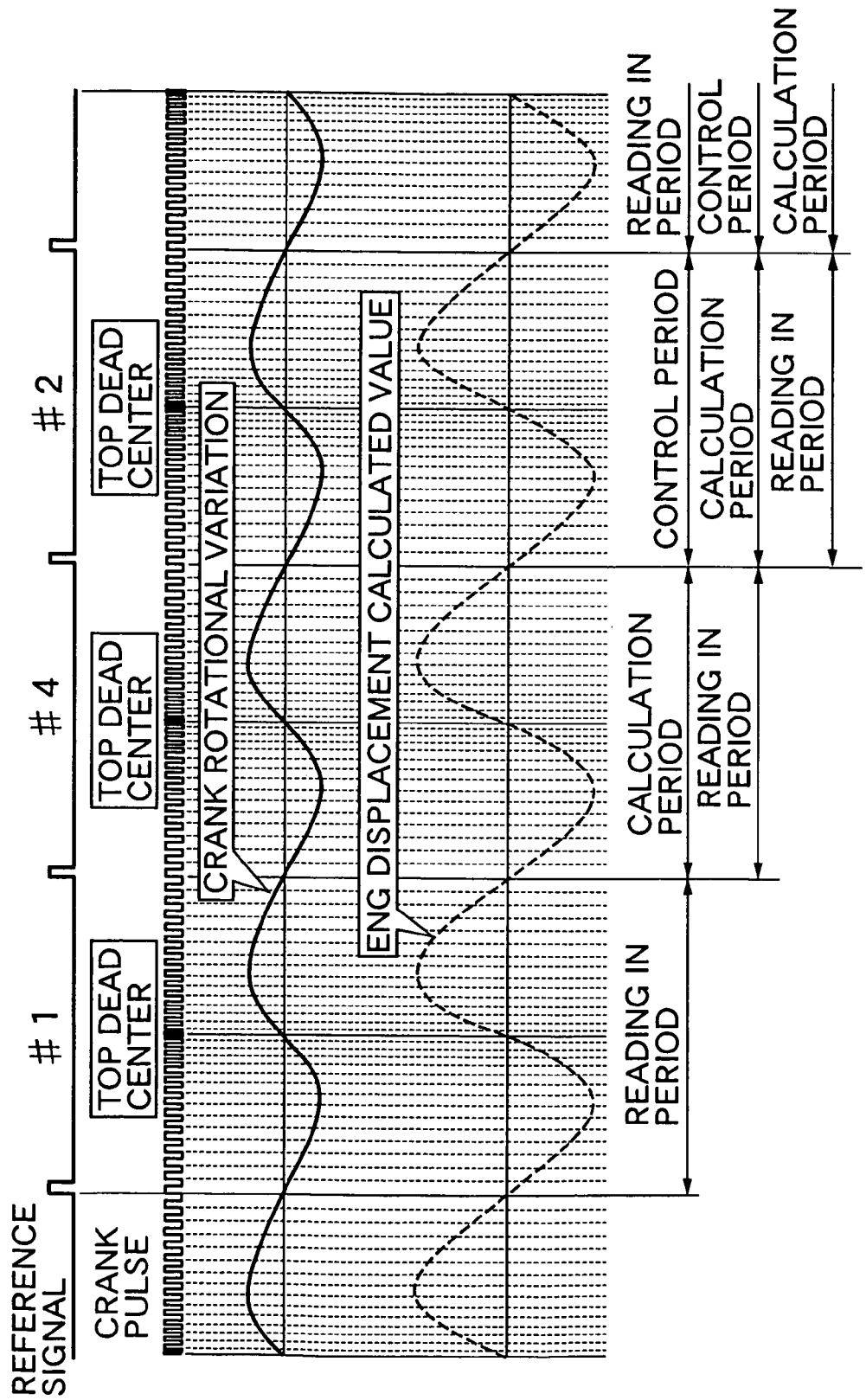

As shown in FIG. 4, control of the active vibration isolation support system M involves reading in a vibrational state of the engine in one particular cycle (hereinafter referred to as the read-in period), calculating a control current for the actuator 41 of the active vibration isolation support system M in the following one cycle (hereinafter referred to as the calculation period), and outputting the control current in the further following one cycle (hereinafter referred to as the control period), thereby operating the actuator 41 of the active vibration isolation support system M. Therefore, the operation of the active vibration isolation support system M in the current cycle is therefore controlled based on the vibrational state of the cycle before the previous cycle.

The operation of the active vibration isolation support system M having the above-mentioned arrangement is now described.

When low frequency engine shake vibration occurs while the automobile is traveling, the first elastic body 19 is deformed by a load input from the engine via the diaphragm support boss 20 and the first elastic body support boss 18, thus changing the capacity of the first liquid chamber 30, so that a liquid moves to and fro between the first liquid chamber 30 and the third liquid chamber 35 via the through passage 32. When the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. The shape and the dimensions of the through passage 32 and the spring constant of the first elastic body 19 are set so that a low spring constant and high attenuation force are exhibited in the frequency region of the engine shake vibration. Therefore, it is possible to effectively suppress the vibration transmitted from the engine to the vehicle body frame.

In the frequency region of the engine shake vibration, the actuator 41 is maintained in a non-operating state.

When there is vibration having a higher frequency than that of the above-mentioned engine shake vibration, that is, vibration during idling or vibration during cylinder cut-off due to rotation of the engine crankshaft, the liquid within the through passage 32 providing communication between the first liquid chamber 30 and the third liquid chamber 35 becomes stationary and a vibration isolation function cannot be exhibited; the actuator 41 is therefore driven to exhibit a vibration isolation function.

In order to operate the actuator 41 of the active vibration isolation support system M to exhibit the vibration isolation function, the electronic control unit U controls the supply of current to the coil 46 based on signals from the crank pulse sensor Sa and the TDC pulse sensor Sb.

The control of the active vibration isolation support system M is now specifically described.

Figure 5:
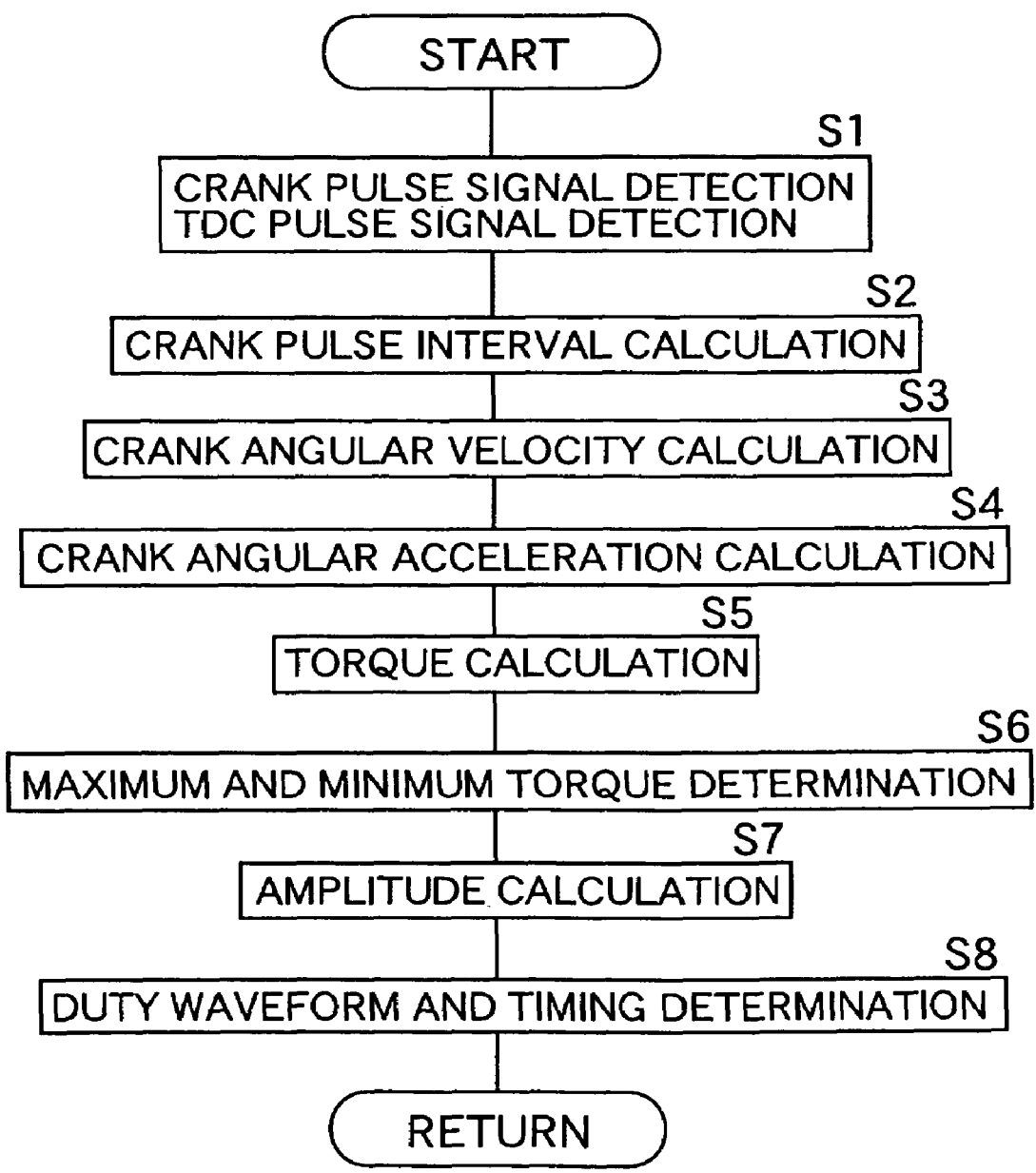

In the flow chart of FIG. 5, firstly in step S1, crank pulses output from the crank pulse sensor Sa every 15° of crank angle, and crank pulses output from the TDC pulse sensor Sb every 120° of crank angle are read in. In step S2, the crank pulses thus read in are compared with a reference TDC pulse so as to calculate a time interval between the crank pulses. In step S3, a crank angular velocity ω is calculated by dividing the 15° crank angle by the time interval between the crank pulses. In step S4, a crank angular acceleration dω/dt is calculated by differentiating the crank angular velocity ω with respect to time. In step S5, a torque Tq around the engine crankshaft 62 is calculated from $$Tq = I \times d\omega/dt,$$

where I is the moment of inertia around the engine crankshaft 62. This torque Tq becomes 0 if it is assumed that the crankshaft rotates at a constant angular velocity ω, but in an expansion stroke the angular velocity ω increases by acceleration of a piston, and in a compression stroke the angular velocity ω decreases by deceleration of the piston, thus generating a crank angular acceleration dω/dt; as a result a torque Tq that is proportional to the crank angular acceleration dω/dt is generated.

In step S6, a maximum value and a minimum value of two successive torque values are determined. In step S7, amplitude at the position of the active vibration isolation support system M supporting the engine is calculated as the difference between the maximum value and the minimum value of the torque, that is, a torque variation. In step S8, a duty waveform of current applied to the coil 46 of the actuator 41 is determined, and a duty output timing of the current is determined by comparing the bottom position of the amplitude with the TDC pulse.

As a result, the active vibration isolation support system M exerts the vibration isolation function as follows.

When the engine moves downward relative to the vehicle body frame and the first elastic body 19 is deformed downwardly thereby decreasing the capacity of the first liquid chamber 30, energizing the coil 46 of the actuator 41 with matching timing allows the movable core 54 to move downward toward the stationary core 42 by means of the attractive force generated in the air gap g, and the second elastic body 27 is deformed downwardly by being drawn by the movable member 28 connected to the movable core 54 via the rod 55. As a result, the capacity of the second liquid chamber 31 increases, so that the liquid in the first liquid chamber 30, which is compressed by the load from the engine, passes through the through hole 29a of the partition member 29 and flows into the second liquid chamber 31, thereby reducing the load transmitted from the engine to the vehicle body frame.

Subsequently, when the engine moves upward relative to the vehicle body frame and the first elastic body 19 is deformed upwardly, thereby increasing the capacity of the first liquid chamber 30, de-energizing the coil 46 of the actuator 41 with matching timing allows the attractive force generated in the air gap g to disappear and the movable core 54 to move freely, so that the second elastic body 27 that has been deformed downwardly recovers upwardly by its own elastic recovery force. As a result, the capacity of the second liquid chamber 31 decreases, and the liquid in the second liquid chamber 31 passes through the through hole 29a of the partition member 29 and flows into the first liquid chamber 30, thereby allowing the engine to move upward relative to the vehicle body frame.

Figure 6:
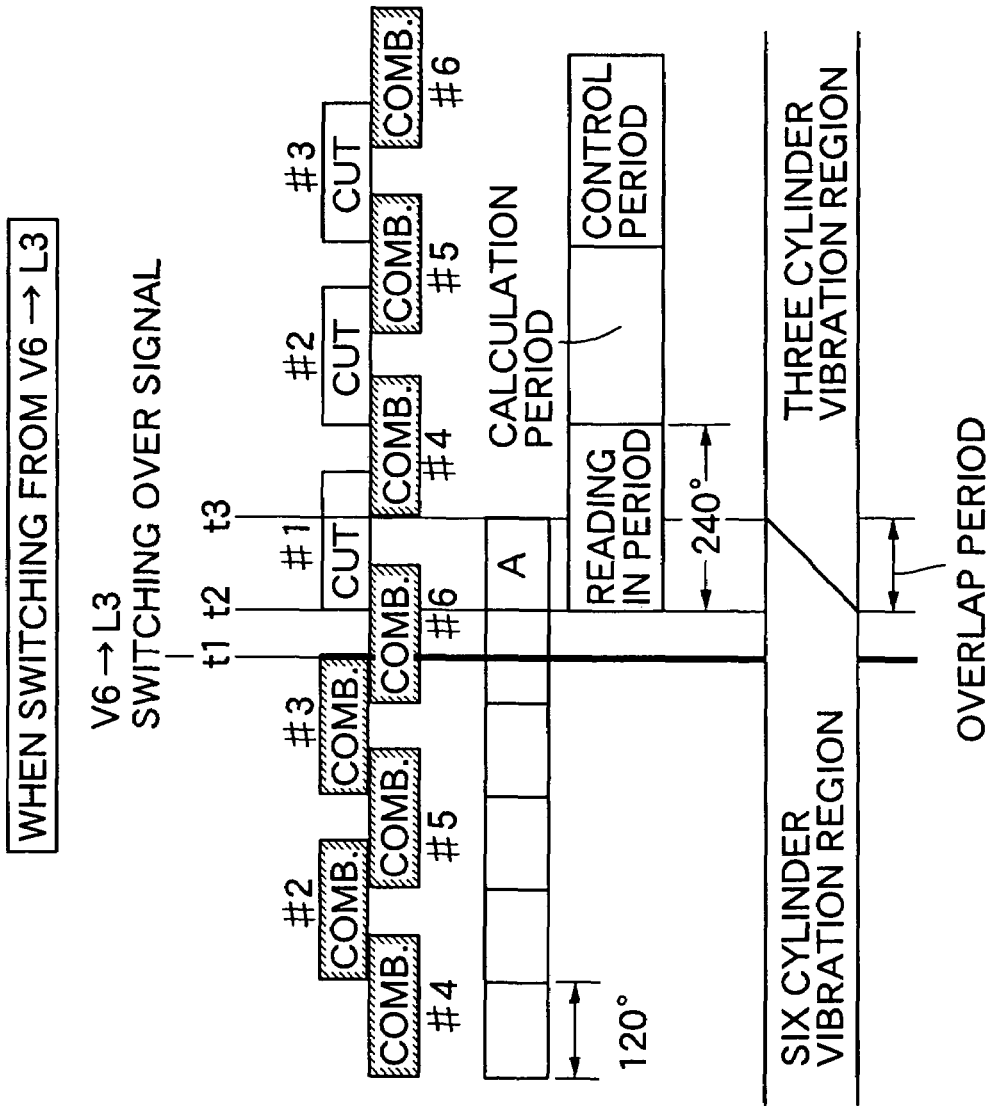

As shown in FIG. 6, when switching between running states from V6 all-cylinder operation in which one cycle of vibration is 120°, to L3 selective cylinder operation in which one cycle of vibration is 240°, a signal to switch over from V6 all-cylinder operation→L3 selective cylinder operation is inputted at t1. After the switch over signal is inputted, although the final cycle of vibration of V6 all-cylinder operation ends at t2, control of the active vibration isolation support system M corresponding to V6 all-cylinder operation is extended from t2 to t3 by a period corresponding to only one cycle (see cycle A), taking into consideration that the vibration pattern of V6 all-cylinder operation continues for one cycle (120°) due to inertia. On the other hand, L3 selective cylinder operation is started at t2, and the read-in period, the calculation period and the control period for which one cycle is 240°, are carried out in sequence. Therefore, the period from t2 to t3 is an overlap period where the first half of the first read-in period of L3 selective cylinder operation overlaps the control period for V6 all-cylinder operation.

Figure 7:
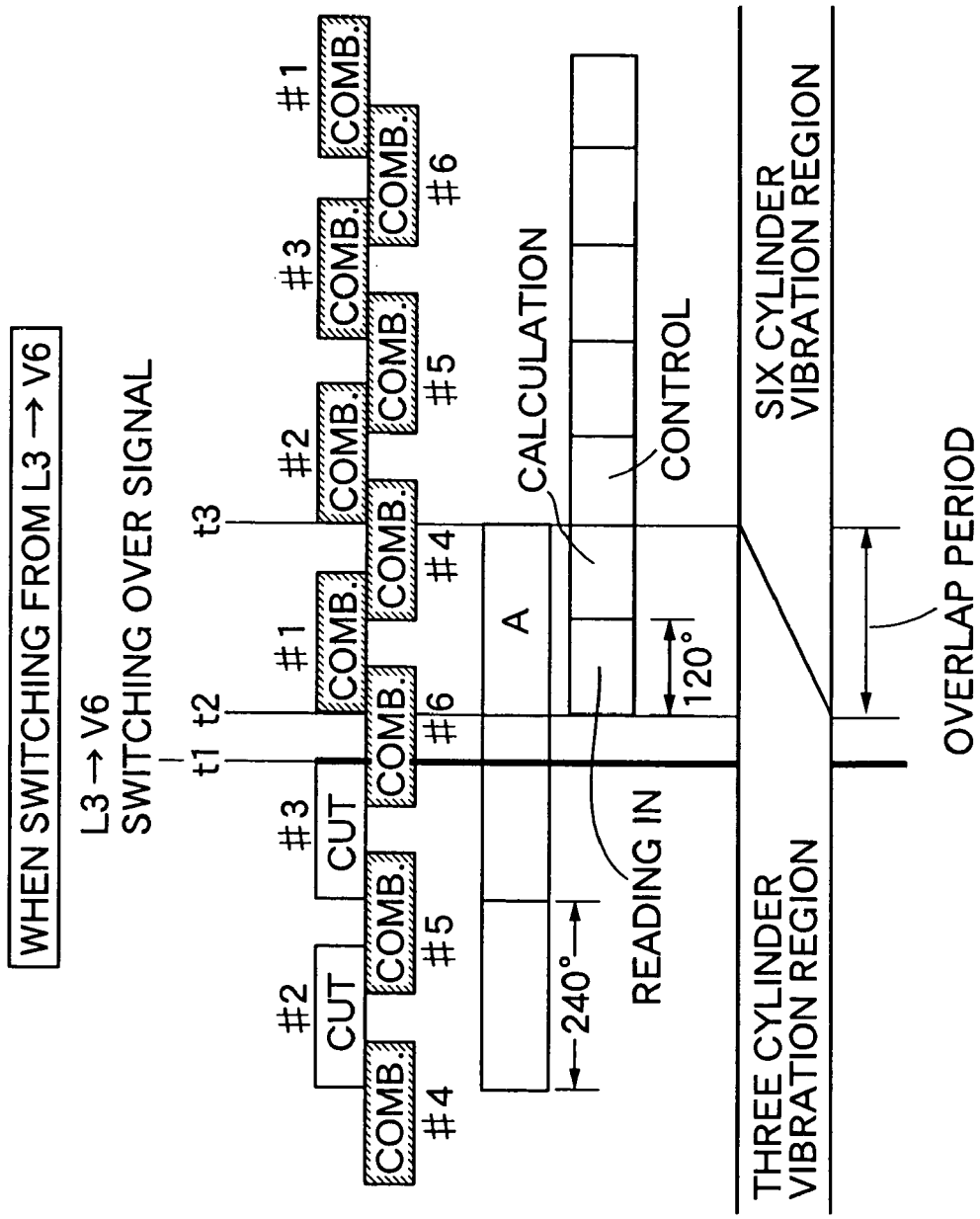

As shown in FIG. 7, when switching between running states from L3 selective cylinder operation in which one cycle of vibration is 240°, to V6 all-cylinder operation in which one cycle of vibration is 120°, a signal to switch over from L3 selective cylinder operation→V6 all-cylinder operation is inputted at t1. After the switch over signal is inputted, although the final cycle of vibration of L3 selective cylinder operation ends at t2, control of the active vibration isolation support system M corresponding to L3 selective cylinder operation is extended from t2 to t3 by a period corresponding to only one cycle (see cycle A), taking into consideration that the vibration pattern of L3 selective cylinder operation continues for one cycle (240°) due to inertia. On the other hand, V6 all-cylinder operation is started at t2, and the read-in period, the calculation period and the control period for which one cycle is 120°, are carried out in sequence. Therefore, the period from t2 to t3 is an overlap period where the whole of the first read-in period and the whole of the first calculation period of V6 all-cylinder operation overlap the control period for L3 selective cylinder operation.

As shown in FIG. 8, when switching between running states from V4 selective cylinder operation in which one cycle of vibration is 360°, to L3 selective cylinder operation in which one cycle of vibration is 240°, a signal to switch over from V4 selective cylinder operation→L3 selective cylinder operation is inputted at t1. After the switch over signal is inputted, although the final cycle of vibration of V4 selective cylinder operation ends at t2, control of the active vibration isolation support system M corresponding to V4 selective cylinder operation is extended from t2 to t3 by a period corresponding to only one cycle (see cycle A), taking into consideration that the vibration pattern of V4 selective cylinder operation continues for one cycle (360°) due to inertia. On the other hand, L3 selective cylinder operation is started at t2, and the read-in period, the calculation period and the control period for which one cycle is 240°, are carried out in sequence. Therefore, the period from t2 to t3 is an overlap period where the whole of the first read-in period and a part of the first calculation period of L3 selective cylinder operation overlap the control period for V4 selective cylinder operation.

As shown in FIG. 9, when switching between running states from L3 selective cylinder operation in which one cycle of vibration is 240°, to V4 selective cylinder operation in which one cycle of vibration is 360°, a signal to switch over from L3 selective cylinder operation→V4 selective cylinder operation is inputted at t1. After the switch over signal is inputted, the final cycle of vibration of L3 selective cylinder operation ends at t2. However, although the period from t2 to t3 has already entered V4 selective cylinder operation, the vibration pattern of L3 selective cylinder operation including #3 cylinder cut-off→#6 cylinder combustion continues for an additional one cycle from t2 to t3 (see cycle B). As a result, after the signal to switch over from L3 selective cylinder operation→V4 selective cylinder operation is inputted at t1, a vibration pattern that can be considered to be L3 selective cylinder operation additionally continues during one cycle from t2 to t3 (see cycle B), and the vibration pattern of L3 selective cylinder operation further continues due to inertia during the following one cycle from t3 to t4 (see cycle A).

As described above, when switching between running states from L3 selective cylinder operation→V4 selective cylinder operation, the vibration pattern of L3 selective cylinder operation continues for longer than usual for a period corresponding to one cycle (cycle B). That is, although control of the active vibration isolation support system M corresponding to L3 selective cylinder operation is normally continued for one cycle (cycle B) after the switch over signal is inputted, the control is continued for one more cycle (cycle A)(total two cycles (cycle B+cycle A)), thereby enhancing the vibration isolation effect during the switch. In this case, a period from t2 to t4 becomes an overlap period where the whole of the first read-in period and a part of the first calculation period of V4 selective cylinder operation overlap the control period of first L3 selective cylinder operation.

Although the embodiment of the present invention has been described above, various modifications in design can be made thereto without deviating from the subject matter of the present invention.

For example, in the embodiment, the #3 cylinder and the #4 cylinder are non-operational during V4 selective cylinder operation, but the cylinders to be made non-operational are not limited to the #3 cylinder and the #4 cylinder.

What is claimed is:

1. A control system for an active vibration isolation support system which supports, on a vehicle body, an engine that can switch between a first running state and a second running state which differ in the number of cylinders that are permitted to operate,
    the active vibration control system comprising an actuator, and
    the control system comprising a control device for controlling the actuator according to a vibrational state of the engine so as to suppress transmission of vibration from the engine to the vehicle body,
    wherein the control device continues control of the actuator corresponding to a vibration pattern of a running state prior to switching between running states for at least a period corresponding to one cycle of the vibration pattern, after determining that switching between the first and second running states is required, and
    wherein, if the vibration pattern of the running state prior to switching between running states continues after the control device determines that switching between the first and second running states is required, the control device further continues control of the actuator corresponding to the vibration pattern of the running state prior to switching between running states for a period corresponding to one cycle of the vibration pattern after continuation and extinction of the vibration pattern of the running state prior to the switching between running states.

2. The control system for an active vibration isolation support system of claim 1 wherein
    the engine comprises six cylinders arranged in a V formation having a cyclic all-cylinder operation vibration pattern, and
    wherein when switching between a running state comprising all-cylinder operation to a selective cylinder operation in which only three in-line cylinders are operating,
        the engine switches over from all cylinder operation to three cylinder in-line operation at a time t1,
        a final cycle of the all-cylinder operation vibration pattern ends at a time t2 which is subsequent to time t1, and
        control of the active vibration isolation support system corresponding to all-cylinder operation is extended from the time t2 to a time t3, where the time period t3-t2 corresponds to one cycle of the all-cylinder operation vibration pattern.

3. The control system for an active vibration isolation support system of claim 2 wherein
    control of the active vibration isolation support system corresponding to selective cylinder operation is started at the time t2 such that the time period t3-t2 is an overlap period where the control corresponding to selective cylinder operation overlaps control corresponding to all-cylinder operation.

4. The control system for an active vibration isolation support system of claim 1 wherein
    the engine comprises six cylinders arranged in a V formation, and
    wherein when switching between a running state comprising selective cylinder operation in which only three in-line cylinders are operating to an operating state in which all cylinders are operating,
        the engine switches over from three in-line cylinder operation to all-cylinder operation at a time t1,
        the three in-line cylinder operation comprises a cyclic three in-line cylinder operation vibration pattern, and a final cycle of the three in-line cylinder operation vibration pattern ends at a time t2 which is subsequent to time t1, and
        control of the active vibration isolation support system corresponding to three in-line cylinder operation is extended from the time t2 to a time t3, where the time period t3-t2 corresponds to one cycle of the three in-line cylinder operation vibration pattern.

5. The control system for an active vibration isolation support system of claim 4 wherein
    control of the active vibration isolation support system corresponding to selective cylinder operation is started at the time t2 such that the time period t3-t2 is an overlap period where the control corresponding to selective cylinder operation overlaps control corresponding to all-cylinder operation.

6. The control system for an active vibration isolation support system of claim 1 wherein
    the engine comprises six cylinders arranged in a V formation, and
    wherein when switching between a running state comprising selective cylinder operation in which only three in-line cylinders are operating to a running state comprising selective cylinder operation in which only four cylinders arranged in a V formation are operating,
        the engine switches over from said three cylinder operation to said four cylinder operation at a time t1,
        the three in-line cylinder operation comprises a cyclic three in-line cylinder operation vibration pattern, and a final cycle of the three in-line cylinder operation vibration pattern ends at a time t2 which is subsequent to time t1, and
        control of the active vibration isolation support system corresponding to three in-line cylinder operation is extended from the time t2 to a time t3, where the time period t3-t2 corresponds to two cycles of the three in-line cylinder operation vibration pattern.

7. The control system for an active vibration isolation support system of claim 6 wherein
    control of the active vibration isolation support system corresponding to said four cylinder operation is started at the time t2 such that the time period t3-t2 is an overlap period where the control corresponding to three cylinder operation overlaps control corresponding to four cylinder operation.

8. The control system for an active vibration isolation support system of claim 1 wherein
    the engine comprises six cylinders arranged in a V formation, and
    wherein when switching between a running state comprising selective cylinder operation in which only four cylinders arranged in a V formation are operating to a running state comprising selective cylinder operation in which only three in-line cylinders are operating, the engine switches over from said four cylinder operation to said three cylinder operation at a time t1, the four cylinder operation comprises a cyclic 4V cylinder operation vibration pattern, and a final cycle of the 4V cylinder operation vibration pattern ends at a time t2 which is subsequent to time t1, and control of the active vibration isolation support system corresponding to four cylinder operation is extended from the time t2 to a time t3, where the time period t3-t2 corresponds to one cycle of the 4V cylinder operation vibration pattern.

9. The control system for an active vibration isolation support system of claim 8 wherein control of the active vibration isolation support system corresponding to said three cylinder operation is started at the time t2 such that the time period t3-t2 is an overlap period where the control corresponding to three cylinder operation overlaps control corresponding to four cylinder operation.

10. The control system for an active vibration isolation support system of claim 1 wherein control of the active vibration isolation support system comprises a read-in period in which the vibrational state of the engine is monitored for one cycle of the vibration pattern, a calculation period immediately following the read-in period, the calculation period comprising one cycle of the vibration pattern during which calculation of a control current for the actuator is performed, and a control period immediately following the calculation period, the control period comprising one cycle of the vibration pattern during which the control current is outputted to the actuator.

11. The control system for an active vibration isolation support system of claim 1 wherein operation of the active vibration isolation support system in a current cycle of vibration is based on the vibrational state of the cycle of vibration which occurred before the cycle of vibration previous to the current cycle of vibration.

12. A method of controlling an active vibration isolation support system which supports, on a vehicle body, an engine that can switch between a first running state and a second running state which differ in the number of cylinders that are permitted to operate, the active vibration control system comprising an actuator, and the control system comprising a control device for controlling the actuator according to a vibrational state of the engine so as to suppress transmission of vibration from the engine to the vehicle body, the method comprising the following steps:

controlling the actuator corresponding to a vibration pattern of a running state prior to switching between running states for at least a period corresponding to one cycle of the vibration pattern, after determining that switching between the first and second running states is required, and if the vibration pattern of the running state prior to switching between running states continues after the control device determines that switching between the first and second running states is required, controlling the actuator corresponding to the vibration pattern of the running state prior to switching between running states for a further period corresponding to one cycle of the vibration pattern after continuation and extinction of the vibration pattern of the running state prior to the switching between running states.

13. The method of controlling an active vibration isolation support system of claim 12 wherein the engine comprises six cylinders arranged in a V formation having a cyclic all-cylinder operation vibration pattern, and wherein when switching between a running state comprising all-cylinder operation to a selective cylinder operation in which only three in-line cylinders are operating, the method comprises the following method steps:

switching the engine over from all cylinder operation to three cylinder in-line operation at a time t1, ending a final cycle of the all-cylinder operation vibration pattern at a time t2 which is subsequent to time t1, and extending control of the active vibration isolation support system corresponding to all-cylinder operation from the time t2 to a time t3, where the time period t3-t2 corresponds to one cycle of the all-cylinder operation vibration pattern.

14. The method of controlling an active vibration isolation support system of claim 12 wherein the engine comprises six cylinders arranged in a V formation, and wherein when switching between a running state comprising selective cylinder operation in which only three in-line cylinders are operating to an operating state in which all cylinders are operating and in which the three in-line cylinder operation comprises a cyclic three in-line cylinder operation vibration pattern, the method comprises the following method steps:

switching the engine over from three in-line cylinder operation to all-cylinder operation at a time t1, ending a final cycle of the three in-line cylinder operation vibration pattern at a time t2 which is subsequent to time t1, and extending control of the active vibration isolation support system corresponding to three in-line cylinder operation from the time t2 to a time t3, where the time period t3-t2 corresponds to one cycle of the three in-line cylinder operation vibration pattern.

15. The method of controlling an active vibration isolation support system of claim 12 wherein the engine comprises six cylinders arranged in a V formation, and wherein when switching between a running state comprising selective cylinder operation in which only three in-line cylinders are operating to a running state comprising selective cylinder operation in which only four cylinders arranged in a V formation are operating, and in which the three in-line cylinder operation comprises a cyclic three in-line cylinder operation vibration pattern, the method further comprising the following method steps:

switching the engine over from said three cylinder operation to said four cylinder operation at a time t1, ending a final cycle of the three in-line cylinder operation vibration pattern at a time t2 which is subsequent to time t1, and extending control of the active vibration isolation support system corresponding to three in-line cylinder operation from the time t2 to a time t3, where the time period t3-t2 corresponds to two cycles of the three in-line cylinder operation vibration pattern.

16. The method of controlling an active vibration isolation support system of claim 12 wherein the engine comprises six cylinders arranged in a V formation, and wherein when switching between a running state comprising selective cylinder operation in which only four cylinders arranged in a V formation are operating to a running state comprising selective cylinder operation in which only three in-line cylinders are operating, and in which four cylinder operation comprises a cyclic 4V cylinder operation vibration pattern, the method further comprises the following method steps:

switching the engine over from said four cylinder operation to said three cylinder operation at a time t1, ending a final cycle of the 4V cylinder operation vibration pattern at a time t2 which is subsequent to time t1, and extending control of the active vibration isolation support system corresponding to four cylinder operation from the time t2 to a time t3, where the time period t3-t2 corresponds to one cycle of the 4V cylinder operation vibration pattern.

\* \* \* \* \*